United States Patent
Makin et al.

(10) Patent No.: US 10,528,602 B1
(45) Date of Patent: *Jan. 7, 2020

(54) SYSTEMS AND METHODS FOR FACILITATING ANALYTICS ON REMOTELY STORED DATA SETS

(71) Applicant: Veritas Technologies LLC, Mountain View, CA (US)

(72) Inventors: Gaurav Makin, Shoreview, MN (US); Kirk Searls, Maitland, FL (US); Pradip Kulkarni, Pune (IN)

(73) Assignee: Veritas Technologies LLC, Santa Clara, CA (US)

( * ) Notice: Subject to any disclaimer, the term of this patent is extended or adjusted under 35 U.S.C. 154(b) by 578 days.

This patent is subject to a terminal disclaimer.

(21) Appl. No.: 14/583,546

(22) Filed: Dec. 26, 2014

(51) Int. Cl.
*G06F 16/28* (2019.01)

(52) U.S. Cl.
CPC .................. *G06F 16/289* (2019.01)

(58) Field of Classification Search
CPC ............................................. G06F 17/30607
See application file for complete search history.

(56) References Cited

U.S. PATENT DOCUMENTS

| | | | | |
|---|---|---|---|---|
| 8,489,930 B1 * | 7/2013 | Sim-Tang | ........... | G06F 11/3664 714/38.1 |
| 8,788,628 B1 * | 7/2014 | Taylor | ............... | G06F 17/30132 709/219 |
| 8,849,758 B1 * | 9/2014 | Sivasubramanian | ......................... | G06F 17/30595 707/636 |
| 8,849,764 B1 * | 9/2014 | Long | .................... | G06F 11/1451 707/646 |
| 9,652,568 B1 * | 5/2017 | Tzelnic | ............... | G06F 17/5022 |
| 9,971,797 B1 * | 5/2018 | Kumar | ................ | G06F 11/1448 |
| 2009/0198731 A1 | 8/2009 | Noonan et al. | | |
| 2011/0219108 A1 | 9/2011 | Lisiecki et al. | | |
| 2014/0006465 A1 * | 1/2014 | Davis | ................ | G06F 17/30194 707/827 |
| 2014/0123142 A1 * | 5/2014 | Huh | ....................... | G06F 9/5072 718/1 |

(Continued)

OTHER PUBLICATIONS

"Analytics", http://en.wikipedia.org/wiki/Analytics, as accessed Nov. 7, 2014, Wikipedia, (Jun. 22, 2004).

(Continued)

*Primary Examiner* — Amresh Singh
(74) *Attorney, Agent, or Firm* — FisherBroyles, LLP (57) ABSTRACT

The disclosed computer-implemented method for facilitating analytics on remotely stored data sets may include (1) identifying, within a secondary storage system, a secondary copy of a data set duplicated from a primary copy of the data set stored in a primary storage system, (2) generating a set of virtual objects that represent at least a portion of the secondary copy of the data set, (3) exposing the set of virtual objects to a remote analytics engine via a network such that the portion of the secondary copy of the data set appears to be stored locally on the remote analytics engine, and then (4) enabling the remote analytics engine to perform at least one analytics job on the portion of the secondary copy of the data set by way of the set of virtual objects via the network. Various other methods, systems, and computer-readable media are also disclosed.

15 Claims, 6 Drawing Sheets

(56) References Cited

U.S. PATENT DOCUMENTS

| | | | | |
|---|---|---|---|---|
| 2014/0258639 A1* | 9/2014 | Recupero | ............ | G06F 12/0862 |
| | | | | 711/136 |
| 2015/0277990 A1* | 10/2015 | Xiong | ...................... | G06F 9/52 |
| | | | | 718/106 |
| 2016/0004720 A1* | 1/2016 | Tabaaloute | ........ | G06F 17/30607 |
| | | | | 707/639 |

OTHER PUBLICATIONS

"Extract, transform, load", http://en.wikipedia.org/wiki/Extract,_transform,_load, as accessed Nov. 7, 2014, Wikipedia, (Aug. 15, 2004).

"Apache Hadoop", http://en.wikipedia.org/wiki/Apache_Hadoop, as accessed Nov. 7, 2014, Wikipedia, (Sep. 2, 2011).

"Integrate Hadoop with Unified Information Architecture", http://www.attivio.com/how-we-do-it/key-differentiators/hadoop-integration, as accessed Nov. 7, 2014, Attivio, Inc., (on or before Nov. 7, 2014).

"Cloudera and EMC Launch Joint Solution for Seamless Integration Between EMC Isilon and Cloudera Enterprise Data Hub", http://www.cloudera.com/content/cloudera/en/about/press-center/press-releases/2014/10/13/cloudera-and-emc-launch-joint-solution-for-seamless-integration.html, as accessed Nov. 7, 2014, (Oct. 13, 2014).

* cited by examiner

SYSTEMS AND METHODS FOR FACILITATING ANALYTICS ON REMOTELY STORED DATA SETS

BACKGROUND

Analytics is often used to describe, predict, and/or improve businesses' performance. In this context, the term "analytics" generally refers to the discovery and/or communication of meaningful patterns of data (e.g., data related to businesses' transactions, sales, revenue, and/or relationships). In one example, a company may have a production server that stores a particular data set related to the company's structure and/or business dealings. In this example, the production server may facilitate copying the data set to an analytics engine (such as a HADOOP cluster) that performs analytics on the data set. This process of copying the data set to the analytics engine is traditionally referred to as Extract, Transform, and Load (ETL) for analytics.

Unfortunately, traditional ETL for analytics may have certain drawbacks and/or inefficiencies. For example, traditional ETL for analytics may consume a relatively high amount of network resources (such as processing power and/or bandwidth). Additionally or alternatively, traditional ETL for analytics may represent up to 80% of each analytics job. In other words, up to 80% of the time needed to perform each analytics job may be dedicated to traditional ETL. Accordingly, traditional ETL may lead to excessive resource consumption and/or prolonged processing times in connection with analytics jobs.

The instant disclosure, therefore, identifies and addresses a need for systems and methods for facilitating analytics on remotely stored data sets.

SUMMARY

As will be described in greater detail below, the instant disclosure describes various systems and methods for facilitating analytics on remotely stored data sets by exposing virtual objects to a remote analytics engine without actually copying the data represented by the virtual objects to the remote analytics engine. Moreover, by exposing the virtual objects to the remote analytics engine in this way, the various systems and methods described herein may make the data represented by the virtual objects appear to be stored on the remote analytics engine so that the remote analytics engine is still able to perform analytics on the data.

In one example, a computer-implemented method for facilitating analytics on remotely stored data sets may include (1) identifying, within a secondary storage system, a secondary copy of a data set duplicated from a primary copy of the data set stored in a primary storage system, (2) generating a set of virtual objects that represent at least a portion of the secondary copy of the data set identified within the secondary storage system, (3) exposing the set of virtual objects to a remote analytics engine (such as a cluster-based analytics engine) via a network such that the portion of the secondary copy of the data set appears to the remote analytics engine to be stored locally on the remote analytics engine, and then (4) enabling the remote analytics engine to perform at least one analytics job on the portion of the secondary copy of the data set by way of the set of virtual objects exposed to the remote analytics engine via the network.

In one example, the method may also include providing a user with a user interface that enables the user to select the portion of the secondary copy of the data set. In this example, the method may further include detecting the user's selection of the portion of the secondary copy of the data set via the user interface. Additionally or alternatively, the method may include generating the set of virtual objects that represent the portion of the secondary copy of the data set in response to the user's selection.

In one example, the method may also include exposing the set of virtual objects as a virtual file system to the remote analytics engine via the network. In this example, the method may further include enabling the remote analytics engine to perform the analytics job on the portion of the secondary copy of the data set by way of the virtual file system exposed to the remote analytics engine via the network.

In one example, the method may also include exposing the set of virtual objects to the remote analytics engine without moving or copying the portion of the secondary copy of the data set to the remote analytics engine via the network. In this example, the method may further include enabling the remote analytics engine to perform the analytics job on the portion of the secondary copy of the data set without moving or copying the portion of the secondary copy of the data set to the remote analytics engine.

In one example, the method may also include exposing the set of virtual objects to the remote analytics engine without moving or copying an equivalent portion of the primary copy of the data set to the remote analytics engine via the network. In this example, the method may further include enabling the remote analytics engine to perform the analytics job on the portion of the secondary copy of the data set without moving or copying an equivalent portion of the primary copy of the data set to the remote analytics engine via the network.

In one example, the method may also include exposing the set of virtual objects to the remote analytics engine via the network by way of a file system plug-in that interfaces with a file system (such as a distributed file system) of the remote analytics engine. In this example, the method may further include enabling the remote analytics engine to perform the analytics job on the portion of the secondary copy of the data set via the network by way of the file system plug-in that interfaces with the file system of the remote analytics engine.

In one example, the method may also include receiving, by the file system plug-in, at least one request to perform an Input/Output (I/O) operation on the portion of the secondary copy of the data set. In this example, the method may further include generating, based at least in part on the request to perform the I/O operation, a notification of an anticipated future I/O operation likely to be performed on the portion of the secondary copy of the data set in connection with the analytics job. Additionally or alternatively, the method may include forwarding the notification of the anticipated future I/O operation from the file system plug-in to the secondary storage system to facilitate prefetching some of the portion of the secondary copy of the data set in connection with the analytics job.

In one example, the method may also include receiving, by the file system plug-in, at least one request to perform a write operation on at least some of the portion of the secondary copy of the data set. In this example, the method may further include generating, by the file system plug-in, a data representation of the write operation based at least in part on the request to perform the write operation. Additionally or alternatively, the method may include caching, by the file system plug-in, the data representation of the write operation in memory accessible to the file system plug-in.

Finally, the method may include providing, after completion of the analytics job, the data representation of the write operation to the secondary storage system to facilitate updating the at least some of the portion of the secondary copy of the data set.

In one example, the method may also include identifying another secondary copy of the data set within another secondary storage system. In this example, the method may further include optimizing at least a portion of the analytics job by providing substantially parallel access to the secondary copy of the data set and the other secondary copy of the data set in connection with the analytics job.

In one embodiment, a system for implementing the above-described method may include (1) an identification module, stored in memory, that identifies, within a secondary storage system, a secondary copy of a data set duplicated from a primary copy of the data set stored in a primary storage system, (2) a generation module, stored in memory, that generates a set of virtual objects that represent at least a portion of the secondary copy of the data set within the secondary storage system, (3) an exposure module, stored in memory, that (A) exposes the set of virtual objects to a remote analytics engine via a network such that the virtual objects appear to the remote analytics engine to be stored locally on the remote analytics engine and then (B) enables the remote analytics engine to perform at least one analytics job on the portion of the secondary copy of the data set by way of the set of virtual objects exposed to the remote analytics engine via the network, and (4) at least one physical processor that executes the identification module, the generation module, and the exposure module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (1) identify, within a secondary storage system, a secondary copy of a data set duplicated from a primary copy of the data set stored in a primary storage system, (2) generate a set of virtual objects that represent at least a portion of the secondary copy of the data set identified within the secondary storage system, (3) expose the set of virtual objects to a remote analytics engine via a network such that the portion of the secondary copy of the data set appears to the remote analytics engine to be stored locally on the remote analytics engine, and then (4) enable the remote analytics engine to perform at least one analytics job on the portion of the secondary copy of the data set by way of the set of virtual objects exposed to the remote analytics engine via the network.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for facilitating analytics on remotely stored data sets. As will be explained in greater detail below, by exposing virtual objects to a remote analytics engine without actually copying the data represented by the virtual objects to the remote analytics engine, the various systems and methods described herein may make the data represented by the virtual objects appear to be stored locally on the remote analytics engine. Moreover, by making the data represented by the virtual objects appear to be stored locally on the remote analytics engine in this way, the various systems and methods described herein may be able to reduce the amount of network resources (such as processing power and/or bandwidth) consumed in connection with analytics jobs, reduce the amount of time needed to perform the analytics jobs, and/or substantially instantaneously propagate data updates to the remote analytics engine.

Figure 1:
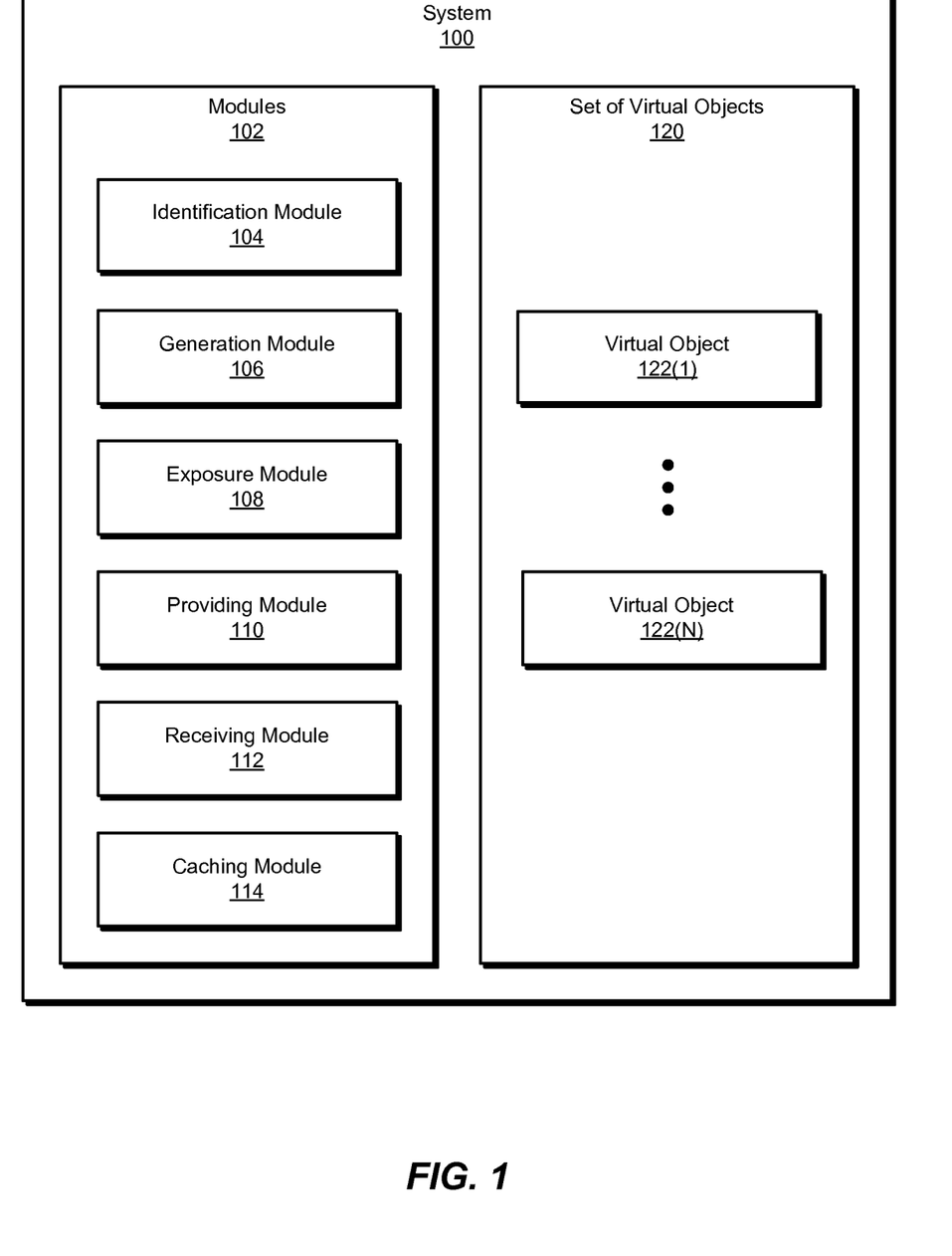
FIG. 1 is a block diagram of an exemplary system for facilitating analytics on remotely stored data sets.
Figure 2:
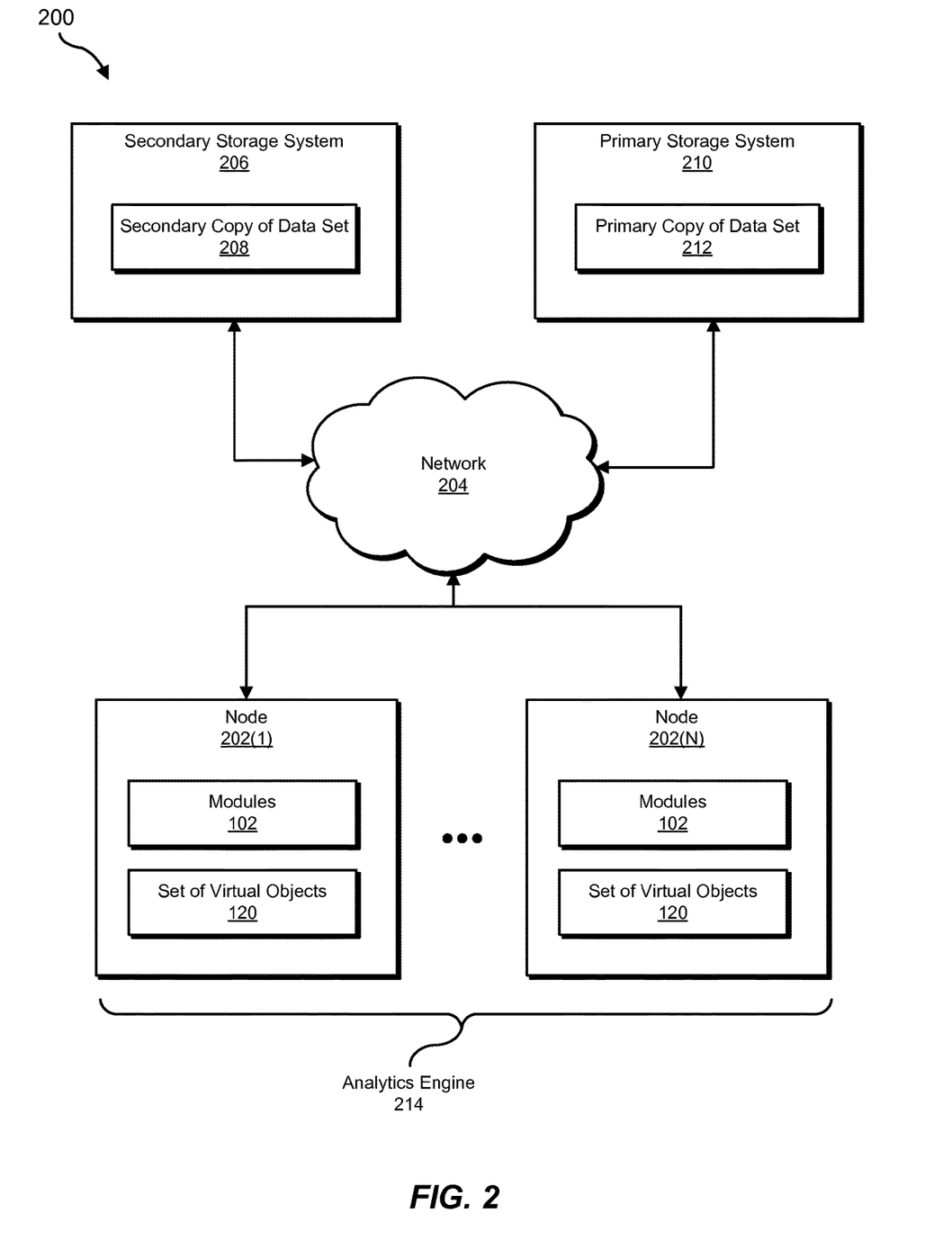
FIG. 2 is a block diagram of an additional exemplary system for facilitating analytics on remotely stored data sets.
Figure 3:
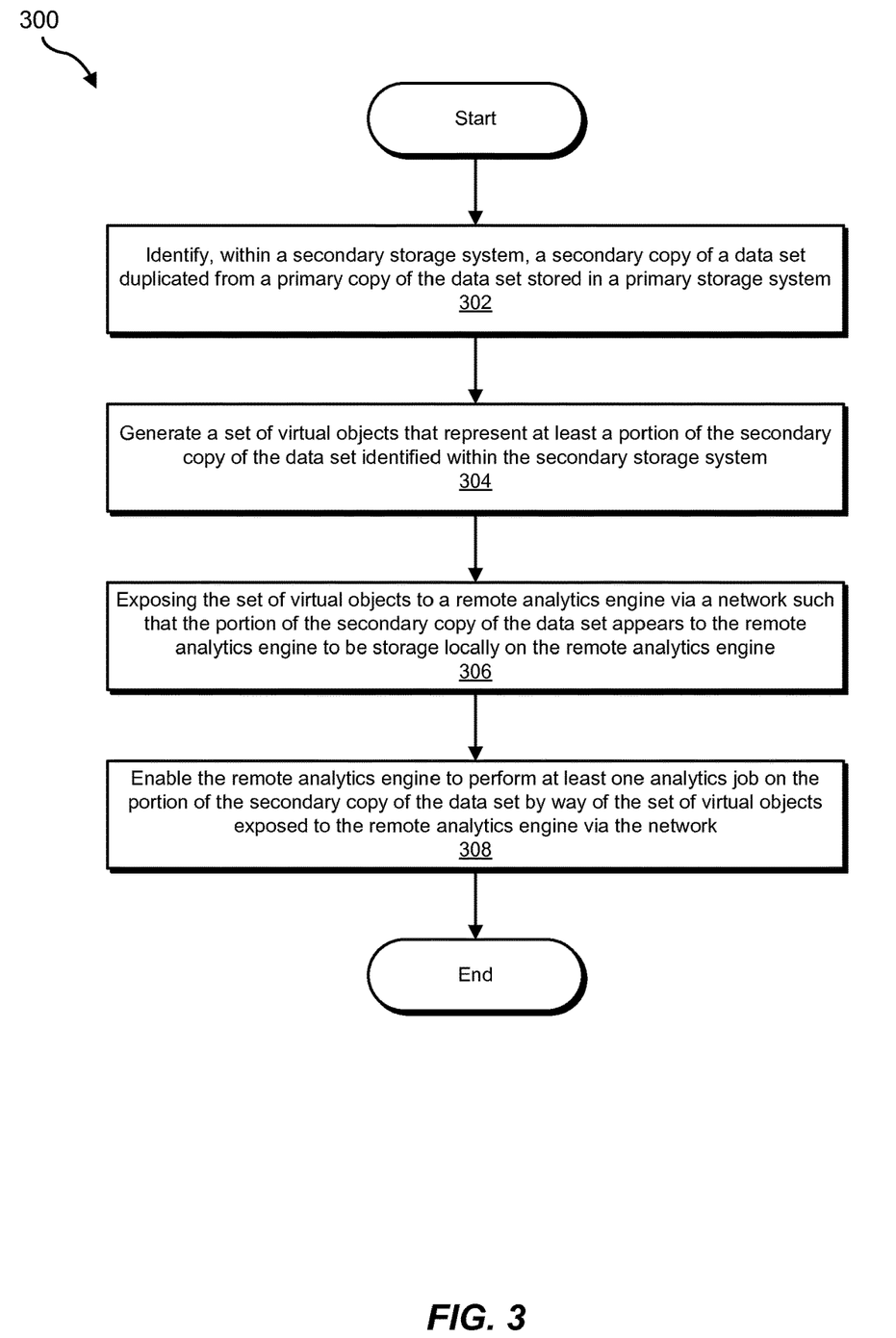
FIG. 3 is a flow diagram of an exemplary method for facilitating analytics on remotely stored data sets.
Figure 4:
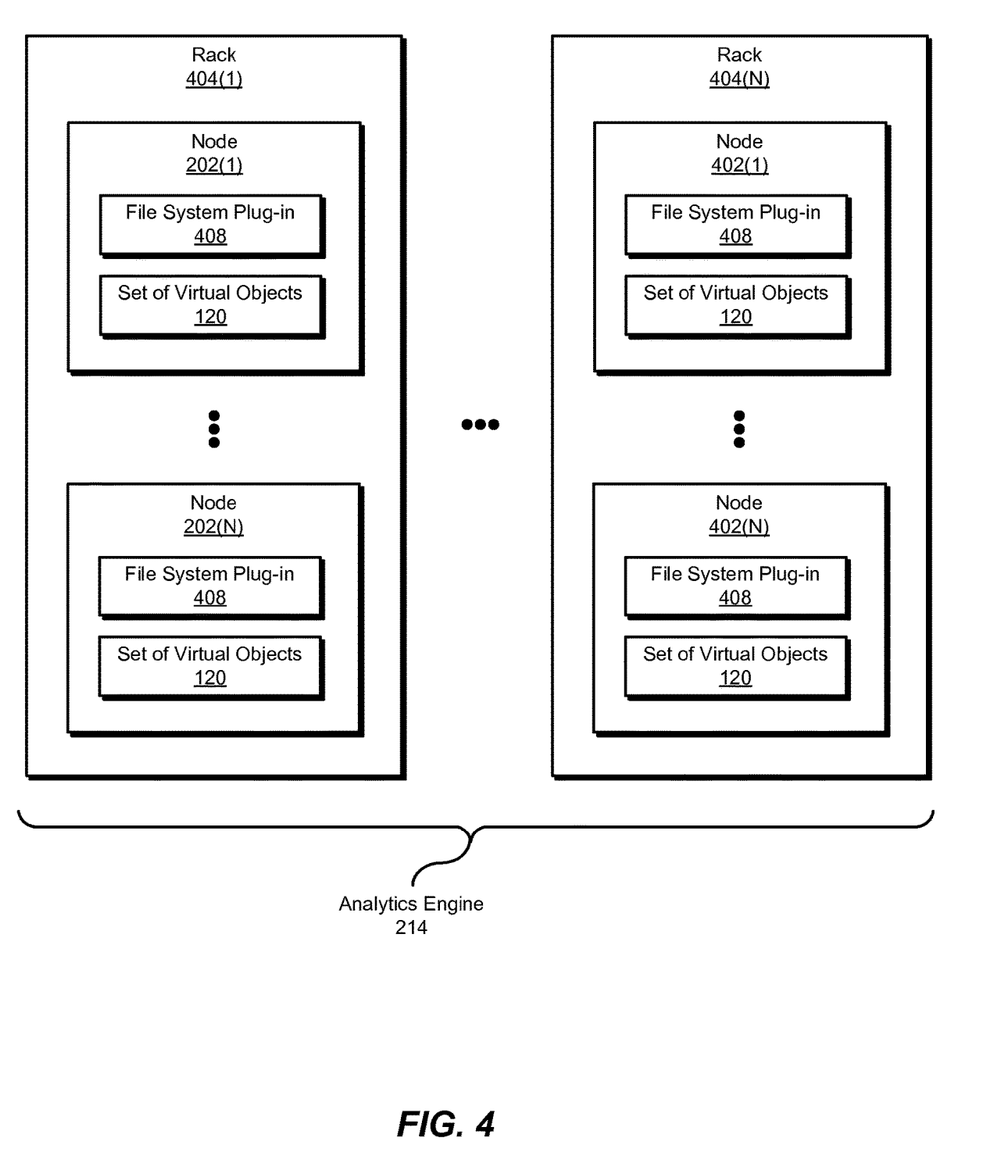
FIG. 4 is a block diagram of an additional exemplary system for facilitating analytics on remotely stored data sets.

The following will provide, with reference to FIGS. 1, 2, and 4, detailed descriptions of exemplary systems for facilitating analytics on remotely stored data sets. Detailed descriptions of corresponding computer-implemented methods will also be provided in connection with FIG. 3. In addition, detailed descriptions of an exemplary computing system and network architecture capable of implementing one or more of the embodiments described herein will be provided in connection with FIGS. 5 and 6, respectively.

FIG. 1 is a block diagram of an exemplary system 100 for facilitating analytics on remotely stored data sets. As illustrated in this figure, exemplary system 100 may include one or more modules 102 for performing one or more tasks. For example, and as will be explained in greater detail below, exemplary system 100 may include an identification module 104 that identifies, within a secondary storage system, a secondary copy of a data set duplicated from a primary copy of the data set stored in a primary storage system. Exemplary system 100 may also include a generation module 106 that generates a set of virtual objects that represent at least a portion of the secondary copy of the data set within the secondary storage system.

In addition, and as will be described in greater detail below, exemplary system 100 may include an exposure module 108 that (1) exposes the set of virtual objects to a remote analytics engine via a network such that the virtual objects appear to the remote analytics engine to be stored locally on the remote analytics engine and (2) enables the remote analytics engine to perform at least one analytics job on the portion of the secondary copy of the data set by way of the set of virtual objects exposed to the remote analytics engine via the network. Moreover, exemplary system 100 may include a providing module 110 that provides a user with a user interface that enables the user to select the portion of the secondary copy of the data set.

Furthermore, exemplary system 100 may include a receiving module 112 that receives at least one request to perform an I/O operation on the portion of the secondary copy of the data set. Exemplary system 100 may additionally include a caching module 114 that that caches a data representation of a write operation in memory. Although illustrated as separate elements, one or more of modules 102 in FIG. 1 may represent portions of a single module or application (such as a file system plug-in).

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., nodes 202(1)-(N), primary storage system 210, and/or secondary storage system 206), computing system 510 in FIG. 5, and/or portions of exemplary network architecture 600 in FIG. 6. One or more of modules 102 in FIG. 1 may also represent all or portions of one or more special-purpose computers configured to perform one or more tasks.

As illustrated in FIG. 1, exemplary system 100 may also include one or more virtual objects, such as set of virtual objects 120. The term "virtual object," as used herein, generally refers to any type or form of object, reference, and/or identifier that represents and/or corresponds to data within a data set. In one example, set of virtual objects 120 may include virtual object 122(1) that represents at least a portion of a data set. Additionally or alternatively, set of virtual objects 120 may include virtual object 122(N) that represents at least a portion of a data set.

Exemplary system 100 in FIG. 1 may be implemented in a variety of ways. For example, all or a portion of exemplary system 100 may represent portions of exemplary system 200 in FIG. 2. As shown in FIG. 2, system 200 may include a primary storage system 210 and/or a secondary storage system 206 in communication with a remote analytics engine 214 via a network 204. In one example, primary storage system 210 may include and/or store a primary copy of data set 212. Additionally or alternatively, secondary storage system 206 may include and/or store a secondary copy of data set 208. In this example, secondary copy of data set 208 may represent a duplicate and/or backup of primary copy of data set 212.

As shown in FIG. 2, analytics engine 214 may include nodes 202(1)-(N). In one example, one or more of nodes 202(1)-(N) may include may be programmed with one or more of modules 102. In this example, one or more of nodes 202(1)-(N) may include and/or generate or be exposed to set of virtual objects 120.

In one example, secondary storage system 206 may be programmed with one or more of modules 102 (although not illustrated as such in FIG. 2). Additionally or alternatively, secondary storage system 206 may include and/or generate set of virtual objects 120 (although not illustrated as such in FIG. 2).

In one embodiment, one or more of modules 102 from FIG. 1 may, when executed by at least one processor of one or more of nodes 202(1)-(N), enable such nodes to facilitate analytics on remotely stored data sets. For example, and as will be described in greater detail below, one or more of modules 102 may cause one or more of nodes 202(1)-(N) to (1) identify, within secondary storage system 206, secondary copy of a data set 208 duplicated from primary copy of data set 212 stored in primary storage system 210, (2) generate set of virtual objects 120 that represent at least a portion of secondary copy of data set 208 identified within secondary storage system 206, (3) exposing set of virtual objects 120 to remote analytics engine 214 via network 204 such that the portion of secondary copy of data set 208 appears to remote analytics engine 214 to be stored locally on remote analytics engine 214, and then (4) enabling remote analytics engine 214 to perform at least one analytics job on the portion of secondary copy of data set 208 by way of set of virtual objects 120 exposed to remote analytics engine 214 via network 204.

Analytics engine 214 generally represents any type or form of computing platform that performs and/or facilitates analytics. In one example, analytics engine 214 may represent a cluster-based analytics engine. For example, analytics engine 214 may represent a HADOOP cluster that includes nodes 202(1)-(N). Analytics engine 214 may also include one or more additional nodes (e.g., master nodes, NameNodes, DataNodes), components (e.g., JobTrackers and/or TaskTrackers), and/or switches not illustrated in FIG. 2. Analytics engine 214 may perform and/or facilitate any type or form of analytics. Examples of such analytics include, without limitation, predictive analytics, decision management analytics, web analytics, sales analytics, optimization analytics, risk analytics, marketing analytics, fraud analytics, application analytics, variations of one or more of the same, combinations of one or more of the same, and/or any other suitable analytics.

Nodes 202(1)-(N) generally represent any type or form of computing device capable of reading computer-executable instructions. Examples of nodes 202(1)-(N) include, without limitation, master nodes, NameNodes, DataNodes, laptops, tablets, desktops, servers, cellular phones, Personal Digital Assistants (PDAs), multimedia players, embedded systems, wearable devices (e.g., smart watches, smart glasses, etc.), gaming consoles, combinations of one or more of the same, exemplary computing system 510 in FIG. 5, or any other suitable computing device.

Primary storage system 210 generally represents any type or form of storage device capable of maintain, storing, and/or distributing a data set. In one example, primary storage system 210 may include and/or represent one or more production servers of an organization. Examples of primary storage system 210 include, without limitation, servers, computing devices, disk drives, hard disk drives, solid-state drives, magnetic tape drives, optical disc drives, magneto-optical disc drives, deduplication storage systems, Random Access Memory (RAM) devices, variations of one or more of the same, combinations of one or more of the same, or any other suitable storage system.

Secondary storage system 206 generally represents any type or form of storage device capable of maintain, storing, and/or distributing a data set. In one example, secondary storage system 206 may include and/or represent one or more backup storage devices and/or replication devices. Examples of secondary storage system 206 include, without limitation, servers, computing devices, disk drives, hard disk drives, solid-state drives, magnetic tape drives, optical disc drives, magneto-optical disc drives, deduplication storage systems, RAM devices, variations of one or more of the same, combinations of one or more of the same, or any other suitable storage system.

Network 204 generally represents any medium or architecture capable of facilitating communication or data transfer. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), exemplary network architecture 600 in FIG. 6, or the like. Network 204 may facilitate communication or data transfer using wireless or wired connections. In one embodiment, network 204 may facilitate communication among primary storage system 210, secondary storage system 206, and/or analytic engine 214.

FIG. 3 is a flow diagram of an exemplary computer-implemented method 300 for facilitating analytics on remotely stored data sets. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 510 in FIG. 5, and/or portions of exemplary network architecture 600 in FIG. 6.

As illustrated in FIG. 3, at step 302 one or more of the systems described herein may identify, within a secondary storage system, a secondary copy of a data set duplicated from a primary copy of the data set stored in a primary storage system. For example, identification module 104 may, as part of one or more of nodes 202(1)-(N) in FIG. 2, identify secondary copy of data set 208 within secondary storage system 206. In this example, secondary copy of data set 208 may have been duplicated from primary copy of data set 212 stored in primary storage system 210.

The systems described herein may perform step 302 in a variety of ways and/or contexts. In one example, identification module 104 may identify secondary copy of data set 208 as primary copy of data set 212 is copied to secondary storage system 206. For example, identification module 104 may detect a backup and/or replication job that copies at least a portion of primary copy of data set 212 to secondary storage system 206. As a result of this backup and/or replication job, secondary storage system 206 may include and/or store secondary copy of data set 208. Identification module 104 may identify secondary copy of data set 208 during the backup and/or replication job or upon completion of the backup and/or replication job.

In one example, identification module 104 may identify secondary copy of data set 208 based at least in part on an update to secondary copy of data set 208. For example, identification module 104 may detect an update to at least a portion of secondary copy of data set 208 within secondary storage system 206. In this example, the update may represent the addition of new data to secondary copy of data set 208 and/or the modification of existing data included in secondary copy of data set 208. Identification module 104 may identify secondary copy of data set 208 during the update or upon completion of the update.

Returning to FIG. 3, at step 304 one or more of the systems described herein may generate a set of virtual objects that represent at least a portion of the secondary copy of the data set identified within the secondary storage system. For example, generation module 106 may, as part of one or more of nodes 202(1)-(N) in FIG. 2, generate set of virtual objects 120 that represent at least a portion of secondary copy of data set 208 identified within secondary storage system 206. In this example, each of virtual objects 122(1)-(N) included in virtual objects 120 may identify, represent, and/or correspond to certain data within the data set duplicated across primary storage system 210 and secondary storage system 206.

The systems described herein may perform step 304 in a variety of ways and/or contexts. In one example, generation module 106 may generate set of virtual objects 120 by accessing secondary copy of data set 208 stored by secondary storage system 206. For example, generation module 106 may connect to secondary storage system 206 via network 204. Upon connecting to secondary storage system 206, generation module 106 may access at least a portion of secondary copy of data set 208. Generation module 106 may then generate, create, and/or construct set of virtual objects 120 to serve as a representation of the portion of secondary copy of data set 208 to analytics engine 214.

In some examples, one or more of the systems described herein may provide a user with a user interface that enables the user to select the portion of secondary copy of data set 208. For example, providing module 110 may, as part of one or more of nodes 202(1)-(N) in FIG. 2, provide an administrator of secondary storage system 206 and/or analytics engine 214 with a graphical user interface that enables the administrator to select which data within secondary copy of data set 208 to expose to analytics engine 214. Identification module 104 may then detect the user's selection of certain data within secondary copy of data set 208 via the graphical user interface. In response to the user's selection, generation module 106 may generate set of virtual objects 120 that represent the selected data within secondary copy of data set 208.

Returning to FIG. 3, at step 306 one or more of the systems described herein may expose the set of virtual objects to a remote analytics engine via a network such that the portion of the secondary copy of the data set appears to the remote analytics engine to be stored locally on the remote analytics engine. For example, exposure module 108 may, as part of one or more of nodes 202(1)-(N) in FIG. 2, expose set of virtual objects 120 to analytics engine 214 via network 204 such that the portion of secondary copy of data set 208 appears to analytics engine 214 to be stored locally on analytics engine 214.

The systems described herein may perform step 306 in a variety of ways and/or contexts. In some examples, exposure module 108 may expose set of virtual objects 120 to analytics engine 214 by interfacing with a file system of analytics engine 214 and/or secondary storage system 206. In one example, analytics engine 214 may have a distributed file system that stores data and/or files across various nodes. For example, analytics engine 214 may represent a HADOOP cluster that has a HADOOP Distributed File System (HDFS) that stores data and/or files across nodes 202(1)-(N). In this example, exposure module 108 may reside in the I/O path of analytics engine 214 and expose set of virtual objects 120 to analytics engine 214 by interfacing the HDFS with secondary storage system 206.

Exposure module 108 may use any type or form of protocol to facilitate this interface between the HDFS and secondary storage system 206. Examples of such protocols include, without limitation, Network File System (NFS), Common Internet File System (CIFS), Internet Small Computer System Interface (iSCSI), custom agents, variations of one or more of the same, combinations of one or more of the same, or any other suitable protocols.

In one example, exposure module 108 may expose set of virtual objects 120 to analytics engine 214 by way of a virtual file system. For example, exposure module 108 may expose set of virtual objects 120 as a virtual file system to analytics engine 214 via network 204. The term "virtual file system," as used herein, generally refers to any type or form of abstraction layer that enables an analytics engine to access local, remote, and/or network storage devices transparently such that all of the data stored on these devices appear to the analytics engine to be stored and/or maintained by the same file system.

In one example, exposure module 108 may expose set of virtual objects 120 to analytics engine 214 by way of a file system plug-in that interfaces with the file system of analytics engine 214. The term "file system plug-in," as used herein, generally refers to any type or form of module, client, and/or component that interfaces with a file system and/or extends the native functionality of the file system. For example, one or more of modules 102 may represent portions of a file system plug-in that interfaces with the HDFS of analytics engine 214. In this example, the file system plug-in may reside in the I/O path of analytics engine 214 on one or more of nodes 202(1)-(N).

In some examples, exposure module 108 may expose set of virtual objects 120 to analytics engine 214 without moving or copying the portion of secondary copy of data set 208 to analytics engine 214 via network 204. In these examples, exposure module 108 may also expose set of virtual objects 120 to analytics engine 214 without moving or copying an equivalent portion of primary copy of data set 212 to analytics engine 214 via network 204. This equivalent portion of primary copy of data set 212 may be substantially similar and/or identical to the portion of secondary copy of data set 208.

Returning to FIG. 3, at step 308 one or more of the systems described herein may enable the remote analytics engine to perform at least one analytics job on the portion of the secondary copy of the data set by way of the set of virtual objects exposed to the remote analytics engine via the network. For example, exposure module 108 may, as part of one or more of nodes 202(1)-(N) in FIG. 2, enable analytics engine 214 to perform at least one analytics job on the portion of secondary copy of data set 208 by way of set of virtual objects 120 exposed to analytics engine 214 via network 204. Examples of analytics jobs include, without limitation, predictive analytics jobs, decision management analytics jobs, web analytics jobs, sales analytics jobs, optimization analytics jobs, risk analytics jobs, marketing analytics jobs, fraud analytics jobs, application analytics jobs, variations of one or more of the same, combinations of one or more of the same, and/or any other suitable analytics jobs.

The systems described herein may perform step 308 in a variety of ways and/or contexts. In some examples, exposure module 108 may enable analytics engine 214 to perform the analytics job on the portion of secondary copy of data set 208 via the interface between the file system of analytics engine 214 and/or secondary storage system 206. For example, exposure module 108 may reside in the I/O path of analytics engine 214 and interface the HDFS with secondary storage system 206. In this example, exposure module 108 may enable analytics engine 214 to perform the analytics job by accessing the portion of secondary copy of data set 208 via the interface between the HDFS and secondary storage system 206.

In one example, exposure module 108 may enable analytics engine 214 to perform the analytics job on the portion of secondary copy of data set 208 by way of the virtual file system. Additionally or alternatively, exposure module 108 may enable analytics engine 214 to perform the analytics job on the portion of secondary copy of data set 208 by way of the file system plug-in that interfaces with the file system of analytics engine 214.

In one example, exposure module 108 may enable analytics engine 214 to perform the analytics job on the portion of secondary copy of data set 208 without moving or copying the portion of secondary copy of data set 208 to analytics engine 214. Additionally or alternatively, exposure module 108 may enable analytics engine 214 to perform the analytics job on the portion of secondary copy of data set 208 without moving or copying an equivalent portion of primary copy of data set 212 to analytics engine 214.

In some examples, one or more of the systems described herein may provide hints about future I/O operations to secondary storage system 206 based at least in part on the request to perform the I/O operation. For example, the file system plug-in may, as part of one or more of nodes 202(1)-(N) in FIG. 2, receive and/or intercept a request to perform an I/O operation on the portion of secondary copy of data set 208 in connection with the analytics job. This request may be directed to a read operation or a write operation.

Continuing with this example, the file system plug-in may analyze the request to perform the I/O operation. The file system plug-in may then determine, based at least in part on this analysis, an anticipated future I/O operation likely to be performed on the portion of secondary copy of data set 208 in connection with the analytics job. Upon determining this anticipated future I/O operation, the file system plug-in may generate a notification of the anticipated future I/O operation.

The file system plug-in may then forward the notification of the anticipated future I/O operation to secondary storage system 206 via network 204. By forwarding the notification of the anticipated future I/O operation to secondary storage system 206, the file system plug-in may help optimize the performance of the analytics job by enabling secondary storage system 206 to prefetch certain data and/or do extensive read-aheads on certain data (using, e.g., large read-ahead buffers). Accordingly, the notification may essentially suggest and/or hint at which data to prefetch and/or read-ahead to accelerate the analytics job.

In some examples, one or more of the systems described herein may cache data in memory to avoid additional I/O overhead during the analytics job. For example, the file system plug-in may receive at least one request to perform a write operation on certain data included in secondary copy of data set 208. In this example, the file system plug-in may analyze the request to perform the write operation and then determine, based at least in part on this analysis, a data representation of the write operation (e.g., a delta that represents a difference between certain data sets).

Continuing with this example, the file system plug-in may generate a data representation of the write operation based at least in part on the request to perform the write operation. The file system plug-in may then cache the data representation of the write operation in memory accessible to the file system plug-in. For example, the file system plug-in may persist the data representation as a "virtual snapshot" in memory. In this example, the virtual snapshot may enable the file system plug-in to perform data masking and/or capture intermediate states of data. After completion of the analytics job, the file system plug-in may provide the data representation of the write operation to secondary storage system 206 to facilitate updating certain data included in secondary copy of data set 208.

In the event that secondary copy of data set 208 is stored by multiple secondary storage systems (not illustrated in FIG. 2), the file system plug-in may be able to facilitate access to secondary copy of data set 208 via parallel data streams. For example, the file system plug-in may identify another secondary copy of the data set within another secondary storage system (not illustrated in FIG. 2). In this example, the file system plug-in may optimize at least a portion of the analytics job by providing substantially parallel access to secondary copy of data set 208 and the other secondary copy of the data set in connection with the analytics job. In other words, the file system plug-in may enable multiple secondary storage systems to simultaneously source portions of the secondary copy of the data set to analytics engine 214 (using, e.g., scale-out storage techniques). Additionally or alternatively, the file system plug-in may be able to throttle data transfers by controlling the block sizes accessed by analytics engine 214.

In one example, the file system plug-in may determine the computing load on analytical engine 214 and/or the performance of analytics engine 214. In this example, the file system plug-in may control the number of functions and/or processes (e.g., map-reduce jobs) performed by analytics engine 214 in connection with the analytics job.

In one example, the file system plug-in may enable a user to specify how frequently set of virtual objects 120 are refreshed and/or updated to match the data included in secondary copy of data set 208. For example, the user may be able to configure the file system plug-in to facilitate refreshing and/or updating set of virtual objects 120 as soon as new data is added to secondary copy of data set 208 and/or existing data is modified within secondary copy of data set 208. Additionally or alternatively, the user may be able to configure the file system plug-in to facilitate refreshing and/or updating set of virtual objects 120 every few days or so such that set of virtual objects 120 remains unchanged until the next refresh and/or update despite new and/or modified data within secondary copy of data set 208.

As illustrated in FIG. 4, analytics engine 214 may include additional devices, components, and/or mechanisms not illustrated in FIG. 2. For example, analytics engine 214 may include a plurality of racks 404(1)-(N). The term "rack," as used herein, generally refers to any type or form of server and/or chassis that physically houses and/or includes one or more nodes of an analytics engine. In this example, rack 404(1) may physically house nodes 202(1)-(N). Additionally or alternatively, rack 404(N) may physically house nodes 402(1)-(N).

In some examples, each of racks 404(1)-(N) may include a rack switch (not illustrated in FIG. 4) that facilitates communication among the nodes housed by the corresponding rack. Additionally or alternatively, analytics engine 214 may include one or more additional switches that facilitate communication among racks 404(1)-(N).

As illustrated in FIG. 4, analytics engine 214 may include one or more instances of a file system plug-in 408. For example, each of nodes 202(1)-(N) and 402(1)-(N) may include file system plug-in 408 that interfaces with the HDFS of analytics engine 214. In this example, file system plug-in 408 may reside in the I/O path of analytics engine 214 on one or more of nodes 202(1)-(N) and 402(1)-(N).

In some examples, file system plug-in 408 may include one or more of modules 102. For example, file system plug-in 408 may include identification module 104, generation module 106, exposure module 108, providing module 110, receiving module 112, and caching module 114. In this example, these modules may enable file system plug-in 408 to perform one or more of the identifying, generating, exposing, providing, receiving, and/or caching techniques and/or features described above in connection with exemplary method 300 in FIG. 3.

Figure 5:
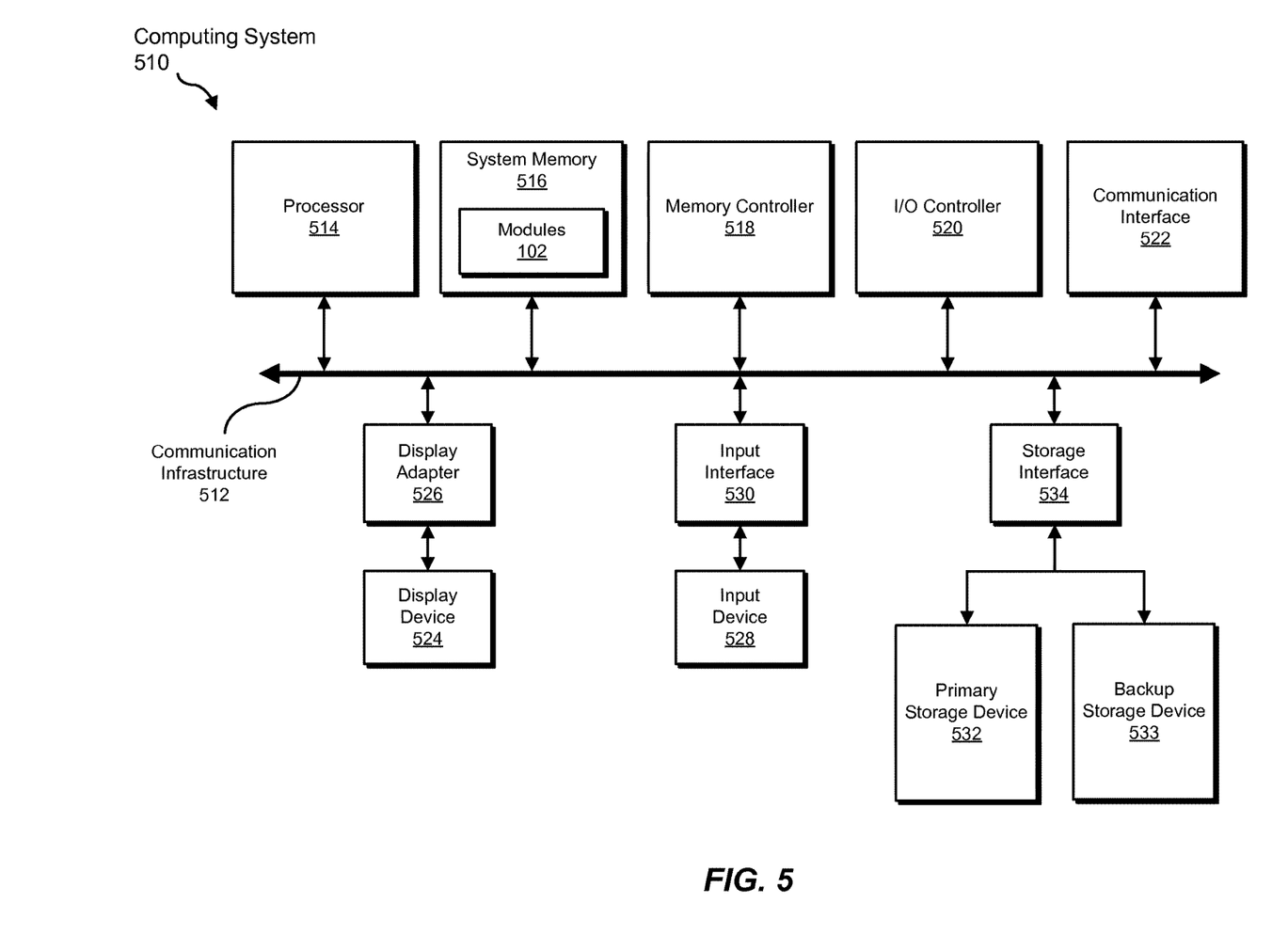
FIG. 5 is a block diagram of an exemplary computing system capable of implementing one or more of the embodiments described and/or illustrated herein.

FIG. 5 is a block diagram of an exemplary computing system 510 capable of implementing one or more of the embodiments described and/or illustrated herein. For example, all or a portion of computing system 510 may perform and/or be a means for performing, either alone or in combination with other elements, one or more of the steps described herein (such as one or more of the steps illustrated in FIG. 3). All or a portion of computing system 510 may also perform and/or be a means for performing any other steps, methods, or processes described and/or illustrated herein.

Computing system 510 broadly represents any single or multi-processor computing device or system capable of executing computer-readable instructions. Examples of computing system 510 include, without limitation, workstations, laptops, client-side terminals, servers, distributed computing systems, handheld devices, or any other computing system or device. In its most basic configuration, computing system 510 may include at least one processor 514 and a system memory 516.

Processor 514 generally represents any type or form of physical processing unit (e.g., a hardware-implemented central processing unit) capable of processing data or interpreting and executing instructions. In certain embodiments, processor 514 may receive instructions from a software application or module. These instructions may cause processor 514 to perform the functions of one or more of the exemplary embodiments described and/or illustrated herein.

System memory 516 generally represents any type or form of volatile or non-volatile storage device or medium capable of storing data and/or other computer-readable instructions. Examples of system memory 516 include, without limitation, RAM, Read Only Memory (ROM), flash memory, or any other suitable memory device. Although not required, in certain embodiments computing system 510 may include both a volatile memory unit (such as, for example, system memory 516) and a non-volatile storage device (such as, for example, primary storage device 532, as described in detail below). In one example, one or more of modules 102 from FIG. 1 may be loaded into system memory 516.

In certain embodiments, exemplary computing system 510 may also include one or more components or elements in addition to processor 514 and system memory 516. For example, as illustrated in FIG. 5, computing system 510 may include a memory controller 518, an Input/Output (I/O) controller 520, and a communication interface 522, each of which may be interconnected via a communication infrastructure 512. Communication infrastructure 512 generally represents any type or form of infrastructure capable of facilitating communication between one or more components of a computing device. Examples of communication infrastructure 512 include, without limitation, a communication bus (such as an Industry Standard Architecture (ISA), Peripheral Component Interconnect (PCI), PCI Express (PCIe), or similar bus) and a network.

Memory controller 518 generally represents any type or form of device capable of handling memory or data or controlling communication between one or more components of computing system 510. For example, in certain embodiments memory controller 518 may control communication between processor 514, system memory 516, and I/O controller 520 via communication infrastructure 512.

I/O controller 520 generally represents any type or form of module capable of coordinating and/or controlling the input and output functions of a computing device. For example, in certain embodiments I/O controller 520 may control or facilitate transfer of data between one or more elements of computing system 510, such as processor 514, system memory 516, communication interface 522, display adapter 526, input interface 530, and storage interface 534.

Communication interface 522 broadly represents any type or form of communication device or adapter capable of facilitating communication between exemplary computing system 510 and one or more additional devices. For example, in certain embodiments communication interface 522 may facilitate communication between computing system 510 and a private or public network including additional computing systems. Examples of communication interface 522 include, without limitation, a wired network interface (such as a network interface card), a wireless network interface (such as a wireless network interface card), a modem, and any other suitable interface. In at least one embodiment, communication interface 522 may provide a direct connection to a remote server via a direct link to a network, such as the Internet. Communication interface 522 may also indirectly provide such a connection through, for example, a local area network (such as an Ethernet network), a personal area network, a telephone or cable network, a cellular telephone connection, a satellite data connection, or any other suitable connection.

In certain embodiments, communication interface 522 may also represent a host adapter configured to facilitate communication between computing system 510 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 522 may also allow computing system 510 to engage in distributed or remote computing. For example, communication interface 522 may receive instructions from a remote device or send instructions to a remote device for execution.

As illustrated in FIG. 5, computing system 510 may also include at least one display device 524 coupled to communication infrastructure 512 via a display adapter 526. Display device 524 generally represents any type or form of device capable of visually displaying information forwarded by display adapter 526. Similarly, display adapter 526 generally represents any type or form of device configured to forward graphics, text, and other data from communication infrastructure 512 (or from a frame buffer, as known in the art) for display on display device 524.

As illustrated in FIG. 5, exemplary computing system 510 may also include at least one input device 528 coupled to communication infrastructure 512 via an input interface 530.

Input device 528 generally represents any type or form of input device capable of providing input, either computer or human generated, to exemplary computing system 510. Examples of input device 528 include, without limitation, a keyboard, a pointing device, a speech recognition device, or any other input device.

As illustrated in FIG. 5, exemplary computing system 510 may also include a primary storage device 532 and a backup storage device 533 coupled to communication infrastructure 512 via a storage interface 534. Storage devices 532 and 533 generally represent any type or form of storage device or medium capable of storing data and/or other computer-readable instructions. For example, storage devices 532 and 533 may be a magnetic disk drive (e.g., a so-called hard drive), a solid state drive, a floppy disk drive, a magnetic tape drive, an optical disk drive, a flash drive, or the like. Storage interface 534 generally represents any type or form of interface or device for transferring data between storage devices 532 and 533 and other components of computing system 510.

In certain embodiments, storage devices 532 and 533 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 532 and 533 may also include other similar structures or devices for allowing computer software, data, or other computer-readable instructions to be loaded into computing system 510. For example, storage devices 532 and 533 may be configured to read and write software, data, or other computer-readable information. Storage devices 532 and 533 may also be a part of computing system 510 or may be a separate device accessed through other interface systems.

Many other devices or subsystems may be connected to computing system 510. Conversely, all of the components and devices illustrated in FIG. 5 need not be present to practice the embodiments described and/or illustrated herein. The devices and subsystems referenced above may also be interconnected in different ways from that shown in FIG. 5. Computing system 510 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 510. All or a portion of the computer program stored on the computer-readable medium may then be stored in system memory 516 and/or various portions of storage devices 532 and 533. When executed by processor 514, a computer program loaded into computing system 510 may cause processor 514 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 510 may be configured as an Application Specific Integrated Circuit (ASIC) adapted to implement one or more of the exemplary embodiments disclosed herein.

Figure 6:
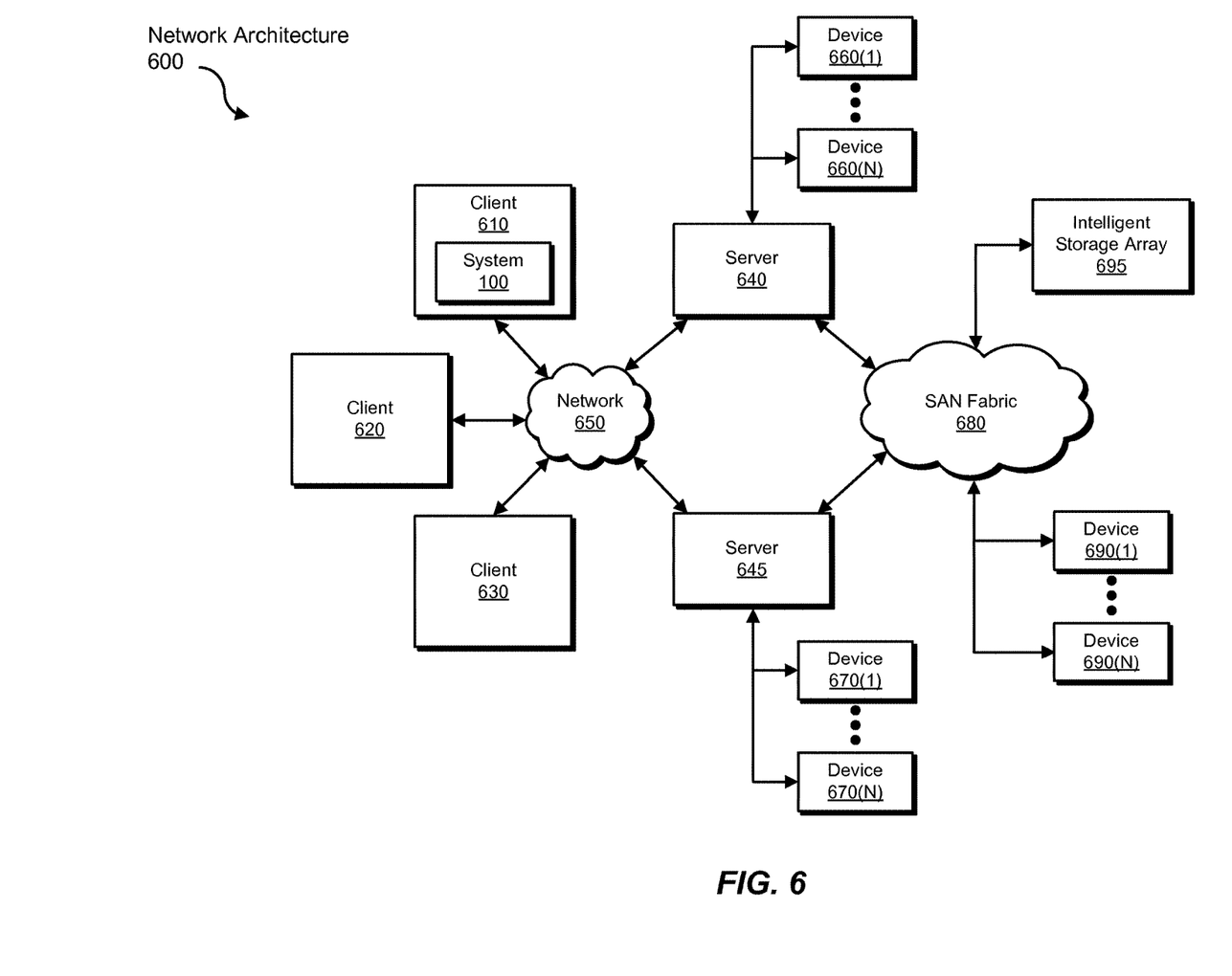
FIG. 6 is a block diagram of an exemplary computing network capable of implementing one or more of the embodiments described and/or illustrated herein.

FIG. 6 is a block diagram of an exemplary network architecture 600 in which client systems 610, 620, and 630 and servers 640 and 645 may be coupled to a network 650. As detailed above, all or a portion of network architecture 600 may perform and/or be a means for performing, either alone or in combination with other elements, one or more of the steps disclosed herein (such as one or more of the steps illustrated in FIG. 3). All or a portion of network architecture 600 may also be used to perform and/or be a means for performing other steps and features set forth in the instant disclosure.

Client systems 610, 620, and 630 generally represent any type or form of computing device or system, such as exemplary computing system 510 in FIG. 5. Similarly, servers 640 and 645 generally represent computing devices or systems, such as application servers or database servers, configured to provide various database services and/or run certain software applications. Network 650 generally represents any telecommunication or computer network including, for example, an intranet, a WAN, a LAN, a PAN, or the Internet. In one example, client systems 610, 620, and/or 630 and/or servers 640 and/or 645 may include all or a portion of system 100 from FIG. 1.

As illustrated in FIG. 6, one or more storage devices 660(1)-(N) may be directly attached to server 640. Similarly, one or more storage devices 670(1)-(N) may be directly attached to server 645. Storage devices 660(1)-(N) and storage devices 670(1)-(N) generally represent any type or form of storage device or medium capable of storing data and/or other computer-readable instructions. In certain embodiments, storage devices 660(1)-(N) and storage devices 670(1)-(N) may represent Network-Attached Storage (NAS) devices configured to communicate with servers 640 and 645 using various protocols, such as Network File System (NFS), Server Message Block (SMB), or Common Internet File System (CIFS).

Servers 640 and 645 may also be connected to a Storage Area Network (SAN) fabric 680. SAN fabric 680 generally represents any type or form of computer network or architecture capable of facilitating communication between a plurality of storage devices. SAN fabric 680 may facilitate communication between servers 640 and 645 and a plurality of storage devices 690(1)-(N) and/or an intelligent storage array 695. SAN fabric 680 may also facilitate, via network 650 and servers 640 and 645, communication between client systems 610, 620, and 630 and storage devices 690(1)-(N) and/or intelligent storage array 695 in such a manner that devices 690(1)-(N) and array 695 appear as locally attached devices to client systems 610, 620, and 630. As with storage devices 660(1)-(N) and storage devices 670(1)-(N), storage devices 690(1)-(N) and intelligent storage array 695 generally represent any type or form of storage device or medium capable of storing data and/or other computer-readable instructions.

In certain embodiments, and with reference to exemplary computing system 510 of FIG. 5, a communication interface, such as communication interface 522 in FIG. 5, may be used to provide connectivity between each client system 610, 620, and 630 and network 650. Client systems 610, 620, and 630 may be able to access information on server 640 or 645 using, for example, a web browser or other client software. Such software may allow client systems 610, 620, and 630 to access data hosted by server 640, server 645, storage devices 660(1)-(N), storage devices 670(1)-(N), storage devices 690(1)-(N), or intelligent storage array 695. Although FIG. 6 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 640, server 645, storage devices 660(1)-(N), storage devices 670(1)-(N), storage devices 690(1)-(N), intelligent storage array 695, or any combination thereof. All or a portion of one or more of the exemplary embodiments disclosed herein may also be encoded as a computer program, stored in server 640, run by server 645, and distributed to client systems 610, 620, and 630 over network 650.

As detailed above, computing system 510 and/or one or more components of network architecture 600 may perform and/or be a means for performing, either alone or in combination with other elements, one or more steps of an exemplary method for facilitating analytics on remotely stored data sets.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of exemplary system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of exemplary system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of exemplary system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of exemplary system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of exemplary system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of exemplary system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may receive data to be transformed, transform the data into virtual objects, output a result of the transformation to expose to an analytics engine, use the result of the transformation to enable the analytics engine to perform an analytics job on the data, and store the result of the transformation to for future use. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for facilitating analytics on remotely stored data sets, at least a portion of the method being performed by a computing device comprising at least one processor, the method comprising:

detecting a replication job that makes, within a secondary storage system, a secondary copy of a data set duplicated from a primary copy of the data set stored in a primary storage system;

in response to detecting the replication job, identifying, within the secondary storage system, the secondary copy of the data set duplicated from the primary copy of the data set stored in the primary storage system;

generating a set of virtual objects that represent at least a portion of the secondary copy of the data set identified within the secondary storage system;

providing an exposure module that resides in an Input/Output (I/O) path of a remote analytics engine, wherein the remote analytics engine comprises a computer cluster that implements a distributed file system that stores data across various nodes;

interfacing, via the exposure module, the distributed file system with the secondary storage system to expose the set of virtual objects to the remote analytics engine via a network by way of a file system plug-in that:
  interfaces with the remote analytics engine such that the portion of the secondary copy of the data set appears to the remote analytics engine to be stored locally on the remote analytics engine;
  extends a native functionality of the distributed file system implemented on the remote analytics engine;

enabling the remote analytics engine to perform at least one analytics job on the portion of the secondary copy of the data set via the network by way of:
  the set of virtual objects exposed to the remote analytics engine via the network;
  the file system plug-in that interfaces with the file system of the remote analytics engine;

throttling, by the file system plug-in that interfaces with the remote analytics engine, one or more data transfers in connection with the analytics job by:
  determining a computing load on the remote analytics engine;
  controlling, based at least in part on the computing load on the remote analytics engine, a block size of data accessible by the remote analytics engine in connection with the analytics job;

controlling, based at least in part on the computing load on the remote analytics engine, a number of map-reduce processes performed by the remote analytics engine in connection with the analytics job; identifying another secondary copy of the data set within another secondary storage system;

receiving, by the file system plug-in, at least one request to perform an I/O operation on the portion of the secondary copy of the data set in connection with the analytics job;

optimizing at least a portion of the analytics job by:
  providing parallel access to the secondary copy of the data set and the other secondary copy of the data set in connection with the analytics job;
  causing the secondary storage system to prefetch some of the portion of the secondary copy of the data set by:
    generating, based at least in part on the request to perform the I/O operation, a notification of an anticipated future I/O operation likely to be performed on the portion of the secondary copy of the data set in connection with the analytics job;
    forwarding the notification of the anticipated future I/O operation from the file system plug-in to the secondary storage system to cause the secondary storage system to:
      prefetch the some of the portion of the secondary copy of the data set;
      perform at least one read-ahead using at least one read-ahead buffer to accelerate the analytics job.

2. The method of claim 1, wherein generating the set of virtual objects that represent the portion of the secondary copy of the data set comprises:
  providing a user with a user interface that enables the user to select the portion of the secondary copy of the data set;
  detecting the user's selection of the portion of the secondary copy of the data set via the user interface;
  generating the set of virtual objects that represent the portion of the secondary copy of the data set in response to the user's selection.

3. The method of claim 1, wherein:
  exposing the set of virtual objects to the remote analytics engine via the network comprises exposing the set of virtual objects as a virtual file system to the remote analytics engine via the network;
  enabling the remote analytics engine to perform the analytics job on the portion of the secondary copy of the data set comprises enabling the remote analytics engine to perform the analytics job on the portion of the secondary copy of the data set by way of the virtual file system exposed to the remote analytics engine via the network.

4. The method of claim 1, wherein:
  exposing the set of virtual objects to the remote analytics engine via the network comprises exposing the set of virtual objects to the remote analytics engine without moving or copying the portion of the secondary copy of the data set to the remote analytics engine via the network;
  enabling the remote analytics engine to perform the analytics job on the portion of the secondary copy of the data set comprises enabling the remote analytics engine to perform the analytics job on the portion of the secondary copy of the data set without moving or copying the portion of the secondary copy of the data set to the remote analytics engine.

5. The method of claim 1, wherein:
  exposing the set of virtual objects to the remote analytics engine via the network comprises exposing the set of virtual objects to the remote analytics engine without moving or copying an equivalent portion of the primary copy of the data set to the remote analytics engine via the network;
  enabling the remote analytics engine to perform the analytics job on the portion of the secondary copy of the data set comprises enabling the remote analytics engine to perform the analytics job on the portion of the secondary copy of the data set without moving or copying an equivalent portion of the primary copy of the data set to the remote analytics engine via the network.

6. The method of claim 1, wherein the analytics engine comprises a cluster-based analytics engine.

7. The method of claim 1, further comprising:
  receiving, by the file system plug-in, at least one request to perform a write operation on at least some of the portion of the secondary copy of the data set;

generating, by the file system plug-in, a data representation of the write operation based at least in part on the request to perform the write operation;

caching, by the file system plug-in, the data representation of the write operation in memory accessible to the file system plug-in;

providing, after completion of the analytics job, the data representation of the write operation to the secondary storage system to facilitate updating the at least some of the portion of the secondary copy of the data set.

8. A system for facilitating analytics on remotely stored data sets, the system comprising:

an identification module, stored in memory, that:
   detects a replication job that makes, within a secondary storage system, a secondary copy of a data set duplicated from a primary copy of the data set stored in a primary storage system;
   in response to detecting the replication job, identifies, within the secondary storage system, the secondary copy of the data set duplicated from the primary copy of the data set stored in the primary storage system;

a generation module, stored in memory, that generates a set of virtual objects that represent at least a portion of the secondary copy of the data set within the secondary storage system;

an exposure module, stored in memory, that:
   resides in an Input/Output (I/O) path of a remote analytics engine, wherein the remote analytics engine comprises a computer cluster that implements a distributed file system that stores data across various nodes; and
   interfaces the distributed file system with the secondary storage system to expose the set of virtual objects to the remote analytics engine via a network by way of a file system plug-in that:
      interfaces with the remote analytics engine such that the portion of the secondary copy of the data set appears to the remote analytics engine to be stored locally on the remote analytics engine;
      extends a native functionality of the distributed file system implemented on the remote analytics engine;
   enables the remote analytics engine to perform at least one analytics job on the portion of the secondary copy of the data set via the network by way of:
      the set of virtual objects exposed to the remote analytics engine via the network;
      the file system plug-in that interfaces with the remote analytics engine;
   wherein:
      the file system plug-in throttles one or more data transfers in connection with the analytics job by:
         determining a computing load on the remote analytics engine;
         controlling, based at least in part on the computing load on the remote analytics engine, a block size of data accessible by the remote analytics engine in connection with the analytics job;
         controlling, based at least in part on the computing load on the remote analytics engine, a number of map-reduce processes performed by the remote analytics engine in connection with the analytics job;
      the identification module identifies another secondary copy of the data set within another secondary storage system;
      the exposure module optimizes at least a portion of the analytics job by:
         providing parallel access to the secondary copy of the data set and the other secondary copy of the data set in connection with the analytics job;
         causing the secondary storage system to prefetch some of the portion of the secondary copy of the data set by performing at least one read-ahead using at least one read-ahead buffer to accelerate the analytics job;

a receiving module, stored in memory, that receives at least one request to perform an I/O operation on the portion of the secondary copy of the data set in connection with the analytics job;

wherein the generation module generates, based at least in part on the request to perform the I/O operation, a notification of an anticipated future I/O operation likely to be performed on the portion of the secondary copy of the data set in connection with the analytics job;

a providing module, stored in memory, that forwards the notification of the anticipated future I/O operation from the file system plug-in to the secondary storage system to cause the secondary storage system to prefetch the some of the portion of the secondary copy of the data set;

at least one physical processor that executes the identification module, the generation module, and the exposure module.

9. The system of claim 8, wherein:
the providing module provides a user with a user interface that enables the user to select the portion of the secondary copy of the data set;
the identification module detects the user's selection of the portion of the secondary copy of the data set via the user interface;
the generation module generates the set of virtual objects that represent the portion of the secondary copy of the data set in response to the user's selection.

10. The system of claim 8, wherein the exposure module:
exposes the set of virtual objects as a virtual file system to the remote analytics engine via the network;
enables the remote analytics engine to perform the analytics job on the portion of the secondary copy of the data set by way of the virtual file system exposed to the remote analytics engine via the network.

11. The system of claim 8, wherein the exposure module:
exposes the set of virtual objects to the remote analytics engine without moving or copying the portion of the secondary copy of the data set to the remote analytics engine via the network;
enables the remote analytics engine to perform the analytics job on the portion of the secondary copy of the data set without moving or copying the portion of the secondary copy of the data set to the remote analytics engine.

12. The system of claim 8, wherein the exposure module:
exposes the set of virtual objects to the remote analytics engine without moving or copying an equivalent portion of the primary copy of the data set to the remote analytics engine via the network;
enables the remote analytics engine to perform the analytics job on the portion of the secondary copy of the data set without moving or copying an equivalent portion of the primary copy of the data set to the remote analytics engine via the network.

13. The system of claim 8, wherein the analytics engine comprises a cluster-based analytics engine.

14. The system of claim 8, wherein:
- the receiving module receives at least one request to perform a write operation on at least some of the portion of the secondary copy of the data set;
- the generation module generates a data representation of the write operation based at least in part on the request to perform the write operation;
- further comprising a caching module, stored in memory, that caches the data representation of the write operation in memory accessible to the file system plug-in;
- wherein the providing module provides, after completion of the analytics job, the data representation of the write operation to the secondary storage system to facilitate updating the at least some of the portion of the secondary copy of the data set.

15. A non-transitory computer-readable medium comprising one or more computer-executable instructions that, when executed by at least one processor of a computing device, cause the computing device to:
- detect a replication job that makes, within a secondary storage system, a secondary copy of a data set duplicated from a primary copy of the data set stored in a primary storage system;
- in response to detecting the replication job, identify, within the secondary storage system, the secondary copy of the data set duplicated from the primary copy of the data set stored in the primary storage system;
- generate a set of virtual objects that represent at least a portion of the secondary copy of the data set within the secondary storage system;
- provide an exposure module that resides in an Input/Output (I/O) path of a remote analytics engine, wherein the remote analytics engine comprises a computer cluster that implements a distributed file system that stores data across various nodes;
- interface, via the exposure module, the distributed file system with the secondary storage system to expose the set of virtual objects to the remote analytics engine via a network by way of a file system plug-in:
  - interfaces with the remote analytics engine such that the portion of the secondary copy of the data set appears to the remote analytics engine to be stored locally on the remote analytics engine;
  - extends a native functionality of the distributed file system implemented on the remote analytics engine;
- enable the remote analytics engine to perform at least one analytics job on the portion of the secondary copy of the data set via the network by way of:
  - the set of virtual objects exposed to the remote analytics engine via the network;
  - the file system plug-in that interfaces with the file system of the remote analytics engine;
- throttle, by the file system plug-in that interfaces with the remote analytics engine, one or more data transfers in connection with the analytics job by:
  - determining a computing load on the remote analytics engine;
  - controlling, based at least in part on the computing load on the remote analytics engine, a block size of data accessible by the remote analytics engine in connection with the analytics job;
  - controlling, based at least in part on the computing load on the remote analytics engine, a number of map-reduce processes performed by the remote analytics engine in connection with the analytics job;
- identify another secondary copy of the data set within another secondary storage system;
- receive, by the file system plug-in, at least one request to perform an I/O operation on the portion of the secondary copy of the data set in connection with the analytics job;
- optimize at least a portion of the analytics job by:
  - providing parallel access to the secondary copy of the data set and the other secondary copy of the data set in connection with the analytics job;
  - causing the secondary storage system to prefetch some of the portion of the secondary copy of the data set by:
    - generating, based at least in part on the request to perform the I/O operation, a notification of an anticipated future I/O operation likely to be performed on the portion of the secondary copy of the data set in connection with the analytics job;
    - forwarding the notification of the anticipated future I/O operation from the file system plug-in to the secondary storage system to cause the secondary storage system to:
      - prefetch the some of the portion of the secondary copy of the data set;
      - perform at least one read-ahead using at least one read-ahead buffer to accelerate the analytics job.

* * * * *